United States Patent
Aikawa et al.

(10) Patent No.: US 11,241,930 B2
(45) Date of Patent: Feb. 8, 2022

(54) VEHICLE-MOUNTED TEMPERATURE CONTROLLER

(71) Applicant: TOYOTA JIDOSHA KABUSHIKI KAISHA, Toyota (JP)

(72) Inventors: Hidefumi Aikawa, Sunto-gun (JP); Yuji Miyoshi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/887,524

(22) Filed: May 29, 2020

(65) Prior Publication Data

US 2021/0008951 A1  Jan. 14, 2021

(30) Foreign Application Priority Data

Jul. 12, 2019 (JP) .............................. JP2019-130311

(51) Int. Cl.
*B60H 1/00* (2006.01)
*B60H 1/03* (2006.01)
*B60H 1/32* (2006.01)

(52) U.S. Cl.
CPC .......... *B60H 1/00028* (2013.01); *B60H 1/03* (2013.01); *B60H 1/3205* (2013.01); *B60H 2001/0015* (2013.01); *B60H 2001/00114* (2013.01)

(58) Field of Classification Search
CPC .... B60H 1/00028; B60H 1/03; B60H 1/3205; B60H 2001/00114; B60H 2001/0015; F25B 2313/003; F25B 2313/004
See application file for complete search history.

(56) References Cited

U.S. PATENT DOCUMENTS 10,220,681 B2 * 3/2019 Katoh ................. B60H 1/3211
2019/0047363 A1 * 2/2019 Sonnekalb ................ F25B 6/02

FOREIGN PATENT DOCUMENTS

JP 2019-045034 A 3/2019

* cited by examiner

*Primary Examiner* — Marc E Norman
(74) *Attorney, Agent, or Firm* — Oliff PLC

(57) ABSTRACT

A vehicle-mounted temperature controller has a first heat circuit and a refrigeration circuit. The first heat circuit has a first radiator exchanging heat with outside air, a first heat exchanger, and a first pump, and configured so that a first heat medium is circulated therethrough. The refrigeration circuit has the first heat exchanger discharging heat from the refrigerant to a first heat medium to make a refrigerant condense, a second heat exchanger absorbing heat to the refrigerant to thereby make the refrigerant evaporate and to cool an object to be cooled, and a compressor, and is configured so that the refrigerant circulates through the first heat exchanger and the second heat exchanger and thereby a refrigeration cycle is realized. When the object to be cooled starts being cooled, the compressor is started up after the first pump is started up.

4 Claims, 8 Drawing Sheets

VEHICLE-MOUNTED TEMPERATURE CONTROLLER

FIELD

The present disclosure relates to a vehicle-mounted temperature controller.

BACKGROUND

In the past, a vehicle-mounted temperature controller including a refrigeration circuit and a heat circuit has been known (for example, PTL 1). In such a vehicle-mounted temperature controller, the refrigeration circuit and the heat circuit share a single heat exchanger. This heat exchanger transfers heat from a refrigerant of the refrigeration circuit to a heat medium of the heat circuit, and causes the refrigerant of the refrigeration circuit to condense.

The heat circuit is provided with a high temperature side radiator exchanging heat with outside air and with a heater core used for heating an inside of a passenger compartment and is configured so that a heat medium circulates through the radiator or heater core and the heat exchanger. The refrigeration circuit is provided with an outside evaporator exchanging heat with the outside air and an inside evaporator used for cooling the inside of the passenger compartment, and is configured so that a refrigeration cycle is realized by the refrigerant circulating through the outside evaporator or inside evaporator and heat exchanger.

In the vehicle-mounted temperature controller configured as above, when cooling the inside of the passenger compartment, heat is absorbed at the inside evaporator of the refrigeration circuit and the refrigerant is heated. The heat of the heated refrigerant is transferred to the heat medium of the heat circuit at the heat exchanger, and then is discharged to the outside air at the high temperature side radiator.

CITATIONS LIST

Patent Literature

[PTL 1] JP 2019-045034 A

SUMMARY

Technical Problem

In this regard, when trying to cool an object, for example, to cool the inside of a passenger compartment by a vehicle-mounted temperature controller such as described in PTL 1, the cooling efficiency of the refrigerant at the heat exchanger changes and in turn the efficiency of cooling, etc., by the vehicle-mounted temperature controller changes, in accordance with the order of start of circulation of the refrigerant in the refrigeration circuit and circulation of the heat medium inside the heat circuit. Therefore, to raise the efficiency of cooling, etc., in the vehicle-mounted temperature controller, it is necessary to start the circulation of the refrigerant inside the refrigeration circuit and the circulation of the heat medium inside the heat circuit, in a suitable order.

In view of the above problem, an object of the present disclosure is to provide a vehicle-mounted temperature controller making a refrigerant in a refrigeration circuit and a heat medium in a heat circuit suitably circulate so as to raise the cooling efficiency of the object to be cooled in a vehicle-mounted temperature controller.

Solution to Problem

The present invention was made so as to solve the above problem and has as its gist the following.

(1) A vehicle-mounted temperature controller, comprising:
a first heat circuit having a first radiator exchanging heat with outside air, a first heat exchanger, and a first pump, and configured so that if the first pump is driven, a first heat medium is circulated therethrough; and
a refrigeration circuit having the first heat exchanger discharging heat from the refrigerant to a first heat medium to make a refrigerant condense, a second heat exchanger absorbing heat to the refrigerant to thereby make the refrigerant evaporate and to cool an object to be cooled, and a compressor, and configured so that if the compressor is driven, the refrigerant circulates through the first heat exchanger and the second heat exchanger and thereby a refrigeration cycle is realized, wherein
when the object to be cooled starts being cooled, the compressor is started up after the first pump is started up.

(2) The vehicle-mounted temperature controller according to above (1), wherein
the first heat circuit further has a heater core used for heating the inside of the passenger compartment and is configured to be able to change a circulation mode of the first heat medium so that the first heat medium circulates through at least one of the first radiator and the heater core, and
when starting to heat the passenger compartment, the first pump is started up after the compressor is started up, and, at the first heat circuit, the first heat medium circulates so as to flow through the heater core.

(3) The vehicle-mounted temperature controller according to above (2), wherein when cooling the object to be cooled, in the first heat circuit, the first heat medium is circulated so as to flow through the first radiator.

(4) The vehicle-mounted temperature controller according to above (2) or (3), further comprising
a second heat circuit having a second radiator exchanging heat with outside air, the second heat exchanger, a heat exchanger for heat generating equipment, which exchanges heat with heat generating equipment, and a second pump, wherein
the second heat circuit is configured to be able to change a circulation mode of a second heat medium so that the second heat medium flows through the second heat exchanger and circulates through at least one of the second radiator and the heat exchanger for heat generating equipment, and
when heating the passenger compartment, in the second heat circuit, the second heat medium is circulated so as to flow through the second radiator.

(5) The vehicle-mounted temperature controller according to above (4), wherein when cooling the second heat medium as the object to be cooled so as to cool the heat generating equipment, at the second heat circuit, the second heat medium is circulated so as to flow through the heat exchanger for heat generating equipment.

Advantageous Effect of the Invention

According to the present disclosure, there is provided a vehicle-mounted temperature controller making a refrigerant in a refrigeration circuit and a heat medium in a heat

DESCRIPTION OF EMBODIMENTS

Figure 1:
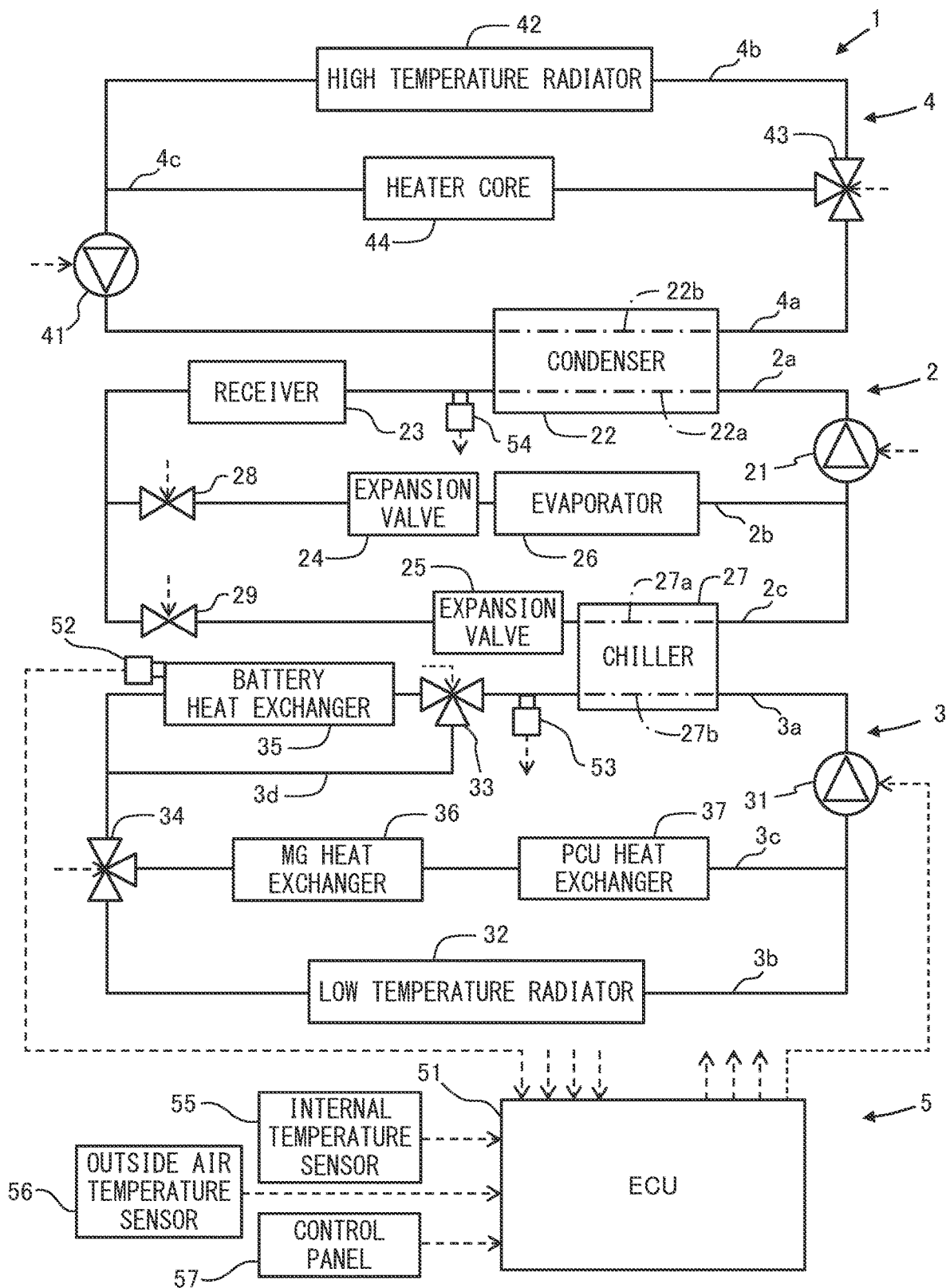
FIG. 1 is a view of the configuration schematically showing a vehicle-mounted temperature controller according to one embodiment.

Below, referring to the drawings, embodiments will be explained in detail. Note that, in the following explanation, similar components are assigned the same reference signs.

Configuration of Vehicle-Mounted Temperature Controller

Figure 2:
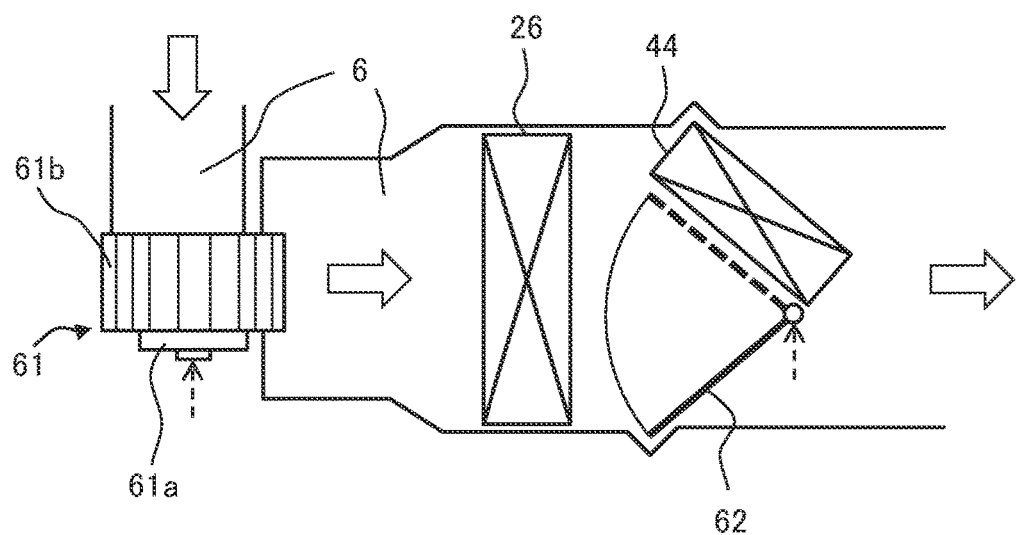
FIG. 2 is a view of the configuration schematically showing an air passage for air-conditioning a vehicle, which mounting the vehicle-mounted temperature controller.
Figure 3:
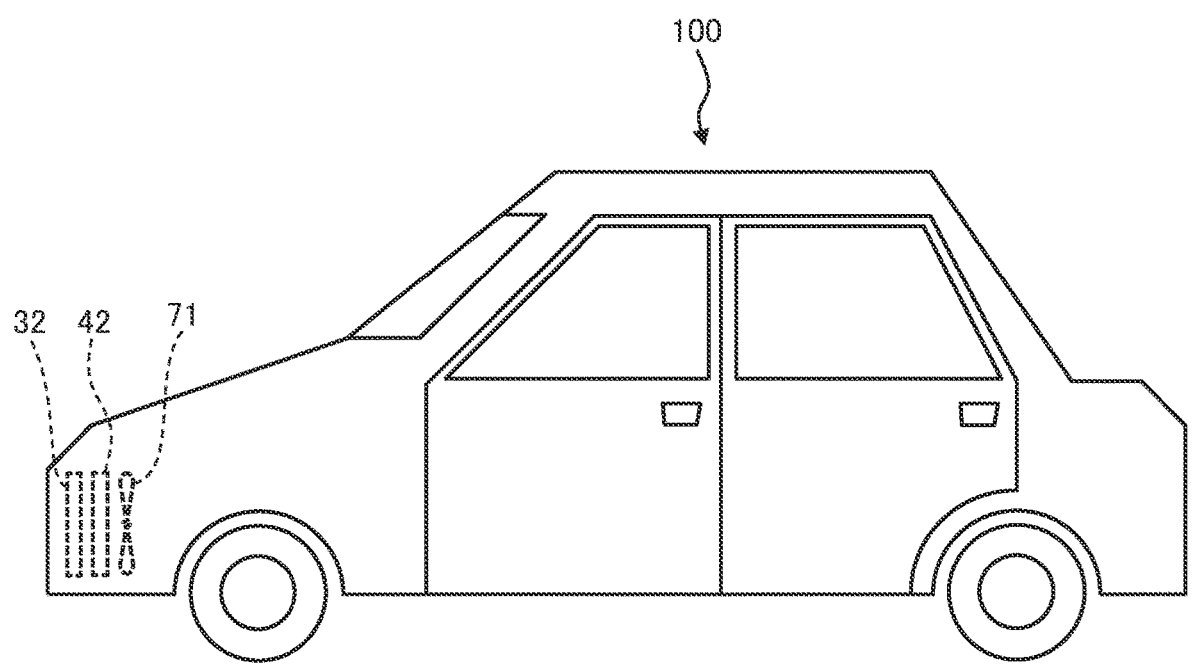
FIG. 3 is a view schematically showing the vehicle mounting the vehicle-mounted temperature controller.

Referring to FIGS. 1 to 3, the configuration of a vehicle-mounted temperature controller 1 according to one embodiment will be explained. FIG. 1 is a view of the configuration schematically showing the vehicle-mounted temperature controller 1. In the present embodiment, the vehicle-mounted temperature controller 1 is particularly mounted in an electric vehicle driven by a motor.

The vehicle-mounted temperature controller 1 includes a refrigeration circuit 2, low temperature circuit (second heat circuit) 3, high temperature circuit (first heat circuit) 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components when the compressor 21 is driven. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the evaporator 26 are provided in that order in a direction of circulation of the refrigerant. In addition, at the chiller flow path 2c, the second solenoid regulating valve 29, the second expansion valve 25, and the refrigerant piping 27a of the chiller 27 are provided in that order.

At the refrigerant basic flow path 2a, the refrigerant flows if one of the first solenoid regulating valve 28 and the second solenoid regulating valve 29 is opened. If the compressor 21 is driven and the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first solenoid regulating valve 28 is opened. If the refrigerant flows to the evaporator flow path 2b, the refrigerant flows through the first solenoid regulating valve 28, the first expansion valve 24, and the evaporator 26 in that order. The refrigerant flows to the chiller flow path 2c when the second solenoid regulating valve 29 is opened. If the refrigerant flows to the chiller flow path 2c, the refrigerant flows through the second solenoid regulating valve 29, the second expansion valve 25, and the refrigerant piping 27a of the chiller 27 in that orders.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a first heat exchanger for discharging heat from the refrigerant to the cooling water of the high temperature circuit 4 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquified, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 functions as an expander for making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expander, instead of the first expansion valve 24 and the second expansion valve 25.

The evaporator 26 functions as a second heat exchanger for absorbing heat from the ambient air to the refrigerant to evaporate the refrigerant. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as a second heat exchanger for making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, in the present embodiment, the solenoid regulating valve 28 is configured as a valve able to be adjusted in opening degree, but it may also be an on-off valve switched between an opened state and a closed state. Further, instead of the first solenoid regulating valve 28 and the second solenoid regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, some sort of valve may also be provided as a circulation mode control device, instead of these solenoid regulating valves 28 and 29.

Next, the low temperature circuit 3 will be explained. The low temperature circuit 3 includes a second pump 31, the cooling water piping 27b of the chiller 27, a low temperature radiator (second radiator) 32, first three-way valve 33, and second three-way valve 34. In addition, the low temperature circuit 3 includes the battery heat exchanger 35, MG heat exchanger 36, and PCU heat exchanger 37. In the low temperature circuit 3, the cooling water circulates through these components Note that, the cooling water is one example of the second heat medium. Inside the low temperature circuit 3, any other heat medium may be used instead of the cooling water.

The low temperature circuit 3 is divided into a low temperature basic flow path 3a, low temperature radiator flow path 3b, and heat generating equipment flow path 3c. The low temperature radiator flow path 3b and the heat generating equipment flow path 3c are provided parallel to each other and are respectively connected to the low temperature basic flow path 3a.

The low temperature basic flow path 3a is provided with, in a direction of circulation of cooling water, the second pump 31, the cooling water piping 27b of the chiller 27, and the battery heat exchanger 35 in that order. Further, at the low temperature basic flow path 3a, a bypass flow path 3d is connected so as to bypass the battery heat exchanger 35. At the connection part of the low temperature basic flow path 3a and the bypass flow path 3d, a first three-way valve 33 is provided.

Further, the low temperature radiator flow path 3b is provided with the low temperature radiator 32. At the heat generating equipment flow path 3c, the MG heat exchanger 36 and PCU heat exchanger 37 are provided in that order in the direction of circulation of cooling water. The heat generating equipment flow path 3c may also be provided with a heat exchanger exchanging heat with heat generating equipment other than the MG or PCU. Between the low temperature basic flow path 3a and low temperature radiator flow path 3b and the heat generating equipment flow path 3c, a second three-way valve 34 is provided.

The second pump 31 pumps the cooling water circulating through the low temperature circuit 3. In the present embodiment, the second pump 31 is electrically driven water pumps, and is configured so as to be able to be changed in discharge capacities steplessly by adjustment of the electric power supplied to the first pump 31.

The low temperature radiator 32 is a heat exchanger exchanging heat with the cooling water circulating through the low temperature circuit 3 and the air outside of the vehicle 100 (outside air). The low temperature radiator 32 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 33 is configured so that the cooling water flowing out from the cooling water piping 27b of the chiller 27 flows selectively into the battery heat exchanger 35 or the bypass flow path 3e. When the first three-way valve 33 is set at the battery heat exchanger 35 side, the cooling water flows through the battery heat exchanger 35. On the other hand, when the first three-way valve 33 is set to the bypass flow path 3d side, the cooling water bypasses the heat exchanger 35.

The second three-way valve 34 is configured so that the refrigerant flowing out from the low temperature basic flow path 3a selectively flows between the low temperature radiator flow path 3b and the heat generating equipment flow path 3c. If the second three-way valve 34 is set to the low temperature radiator flow path 3b side, the cooling water flowing out from the low temperature basic flow path 3a flows through the low temperature radiator 32. On the other hand, if the second three-way valve 34 is set to the heat generating equipment flow path 3c side, the cooling water flowing out from the low temperature basic flow path 3a flows through these MG heat exchanger 36 and PCU heat exchanger 37 in the order of these components. In addition, if able to set the second three-way valve 34 so that the cooling water flows to both, part of the cooling water flowing out from the low temperature basic flow path 3a flows through the low temperature radiator 32, while the remainder flows through the MG heat exchanger 36 and PCU heat exchanger 37 in the order of these components.

Note that, if possible to suitably adjust the flow rate of the cooling water flowing to the battery heat exchanger 35 and bypass flow path 3d, an adjusting valve or on-off valve or other adjusting device may be used, instead of the first three-way valve 33. Similarly, if possible to suitably adjust the flow rate of the cooling water flowing into the low temperature radiator flow path 3b and heat generating equipment flow path 3c, an adjusting valve or on-off valve or other adjusting device may be used, instead of the second three-way valve 34. In any event, these first three-way valve 33 and second three-way valve 34 function as a circulation mode changing device able to change the circulation mode of the cooling water so as to circulate through at least one of the low temperature radiator 32 and the heat exchanger for heat generating equipment.

The battery heat exchanger 35 functions as the heat exchanger for heat generating equipment which exchanges heat with the battery (not shown) of the vehicle 100. Specifically, the battery heat exchanger 35, for example, is provided with piping provided around the battery, and is configured so that heat is exchanged between the cooling water flowing through this piping and the battery. Note that the battery of the vehicle 100 is connected to a later explained PCU and MG of the vehicle 100, and supplies power for driving the vehicle 100.

The MG heat exchanger 36 functions as a heat exchanger for heat generating equipment, which exchanges heat with the motor-generator (MG, not shown) of the vehicle 100, which is a heat generating equipment. Specifically, the MG heat exchanger 36 is configured so as to exchange heat between oil and cooling water flowing around the MG. Note that the MG is used for driving the vehicle 100 and for regenerating when breaking the vehicle 100.

Further, the PCU heat exchanger 37 functions as the heat exchanger for heat generating equipment, which exchanges heat with the power control unit (PCU, not shown) of the vehicle 100. Specifically, the PCU heat exchanger 37 is provided with piping provided around the PCU and is configured so that heat is exchanged between the cooling water flowing through this piping and the battery. Note that the PCU is connected between the battery and the MG, and control the electrical power supplied to the MG. The PCU has heat generating equipment, such as an inverter for driving the motor, boost convertor for controlling voltage, DC-DC convertor for stepping down voltage.

Next, the high temperature circuit 4 will be explained. The high temperature circuit 4 includes a first pump 41, the cooling water piping 22b of the condenser 22, a high temperature radiator (first radiator) 42, a third three-way valve 43, and a heater core 44. In the high temperature circuit 4 as well, the cooling water circulates through these components. Note that, this cooling water is one example of the first heat medium. Inside the high temperature circuit 4, any other heat medium may be used instead of the cooling water.

Further, the high temperature circuit 4 is divided into a high temperature basic flow path 4a, high temperature radiator flow path 4b, and heater flow path 4c. The high temperature radiator flow path 4b and the heater flow path 4c are provided parallel to each other, and are respectively connected to the high temperature basic flow path 4a.

At the high temperature basic flow path 4a, a first pump 41 and the cooling water piping 22b of the condenser 22 are provided in that order in the direction of circulation of the cooling water. At the high temperature radiator flow path 4b, a high temperature radiator 42 is provided. Further, at the heater flow path 4c, the heater core 44 is provided. A third three-way valve 43 is provided between the high temperature basic flow path 4a, and high temperature radiator flow path 4b and the heater flow path 4c.

The first pump 41 pumps the cooling water circulated through the high temperature circuit 4. In the present embodiment, the first pump 41 is an electric type water pump similar to the second pump 31. Further, the high temperature radiator 42, in the same way as the low temperature radiator 32, is a heat exchanger exchanging heat between the cooling water circulating through the high temperature circuit 4 and the outside air.

The third three-way valve 43 functions as a circulation mode control device for controlling the circulation mode of the cooling water flowing out from the cooling water piping 22b of the condenser 22, and is configured to selectively change paths, to which the cooling water flows into, between the high temperature radiator flow path 4b and the heater flow path 4c. If the third three-way valve 43 is set at the high temperature radiator flow path 4b side, the cooling water flowing out from the cooling water piping 22b of the condenser 22 flows through the high temperature radiator flow path 4b. On the other hand, if the third three-way valve 43 is set at the heater flow path 4c side, the cooling water flowing out from the cooling water piping 22b of the condenser 22 flows through the heater core 44. Note that, if possible to suitably adjust the flow rate of cooling water flowing into the high temperature radiator flow path 4b and heater flow path 4c, an adjusting valve or on-off valve or other circulation mode control device may be used instead of the third three-way valve 43.

The heater core 44 is configured to exchange heat between the cooling water circulating through the high temperature circuit 4 and the air surrounding the heater core 44 to thereby heat the passenger compartment. Specifically, the heater core 44 is configured so as to discharge heat from the cooling water to the air surrounding the heater core 44. Therefore, if high temperature cooling water flows to the heater core 44, the temperature of the cooling water is decreased and the air surrounding the heater core 44 is warmed.

FIG. 2 is a view of the configuration schematically showing the air passage 6 for air-conditioning the vehicle 100 mounting the vehicle-mounted temperature controller 1.

In the air passage 6, air flows in the direction shown by the arrow marks in the figure. The air passage 6 shown in FIG. 2 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 2 is connected to air vent openings blowing air into the passenger compartment. Air is supplied from the air passage 6 to any of the air vent openings according to the state of control by the control device 5.

As shown in FIG. 2, at the air passage 6 for air-conditioning of the present embodiment, a blower 61, evaporator 26, air mix door 62, and heater core 44 are provided in that order in the direction of flow of the air.

The blower 61 is provided with a blower motor 61a and a blower fan 61b. The blower 61 is configured so that if the blower fan 61b is driven by the blower motor 61a, the outside air or the air inside the passenger compartment flows into the air passage 6 and the air flows through the air passage 6.

The air mix door 62 adjusts the flow rate of the air flowing through the heater core 44 in the air flowing through the air passage 6. The air mix door 62 is configured to be able to be adjusted among the state where all of the air flowing through the air passage 6 flows through the heater core 44, the state where none of the air flowing through the air passage 6 flows through the heater core 44, and states between them.

In the thus configured air passage 6, when the blower 61 is driven, if the refrigerant circulates through the evaporator 26, the air flowing through the air passage 6 is cooled. Therefore, the passenger compartment is cooled. Further, when the blower 61 is driven, if the cooling water circulates to the heater core 44 and the air mix door 62 is controlled so that air flows through the heater core 44, the air flowing through the air passage 6 is warmed. Therefore, the passenger compartment is warmed.

FIG. 3 is a view schematically showing the vehicle 100 mounting the vehicle-mounted temperature controller 1. As shown in FIG. 3, at the inside of the front grille of the vehicle 100, a low temperature radiator 32 and high temperature radiator 42 are arranged. Therefore, when the vehicle 100 is running, wind generated based on movement of vehicle strikes these radiators 32 and 42. Further, a fan 71 is provided adjacent to these radiators 32 and 42. The fan 71 is configured so that if driven, the air strikes the radiators 32 and 42. Therefore, even when the vehicle 100 is not running, by driving the fan 71, it is possible to make air strike the radiators 32 and 42.

Referring to FIG. 1, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of the battery, a refrigerant pressure sensor 54 detecting a pressure of the refrigerant flowing out from the condenser 22. In addition, the control device is provided with an internal temperature sensor 55 detecting the temperature of the inside of the vehicle 100, an external temperature sensor 56 detecting the temperature of the outside of the vehicle 100, and a control panel 57 which is controlled by a user. The ECU 51 is connected to these sensors, and output signals from these sensors and the control panel 57 are input to the ECU 51.

In addition, the ECU 51 is connected to various types of actuators of the vehicle-mounted temperature controller 1 and controls these actuators. Specifically, the ECU 51 is connected to the compressor 21, the solenoid regulating valves 28 and 29, the pumps 31 and 41, the three-way valves 33, 34, and 43, the blower motor 61a, the air mix door 62, and the fan 71 and controls the same.

Note that, the configuration of the vehicle-mounted temperature controller 1 shown in FIGS. 1 to 3 is one example. The vehicle-mounted temperature controller may be configured differently as well. Specifically, for example, the chiller 27 may also be configured so as to discharge heat into the atmosphere from the refrigerant without connection with the low temperature circuit 3.

Operation of Vehicle-Mounted Temperature Controller

Figure 4:
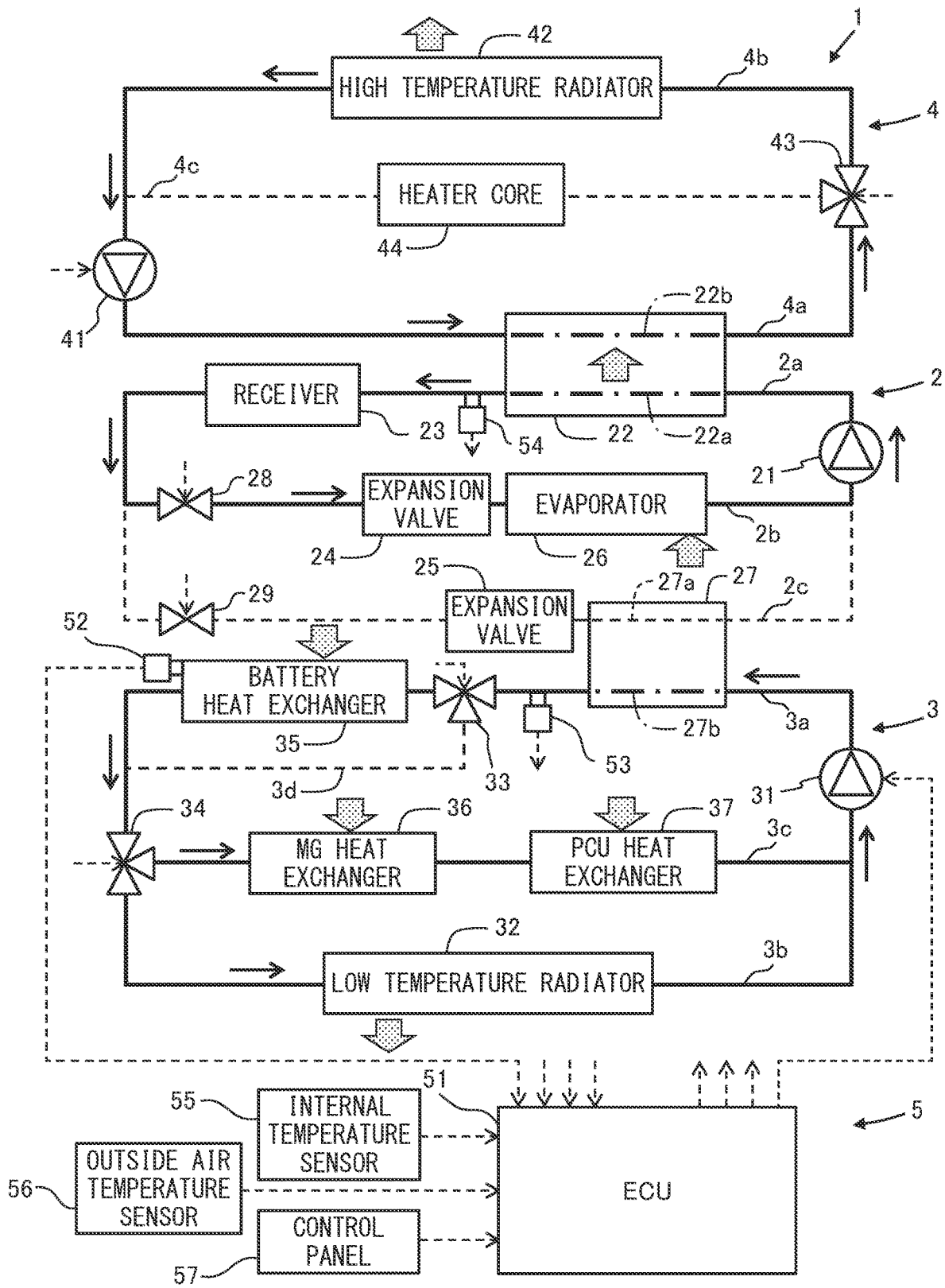
FIG. 4 shows an example of the operating state of the vehicle-mounted temperature controller in the case where cooling of the passenger compartment is demanded (cooling mode).
Figure 5:
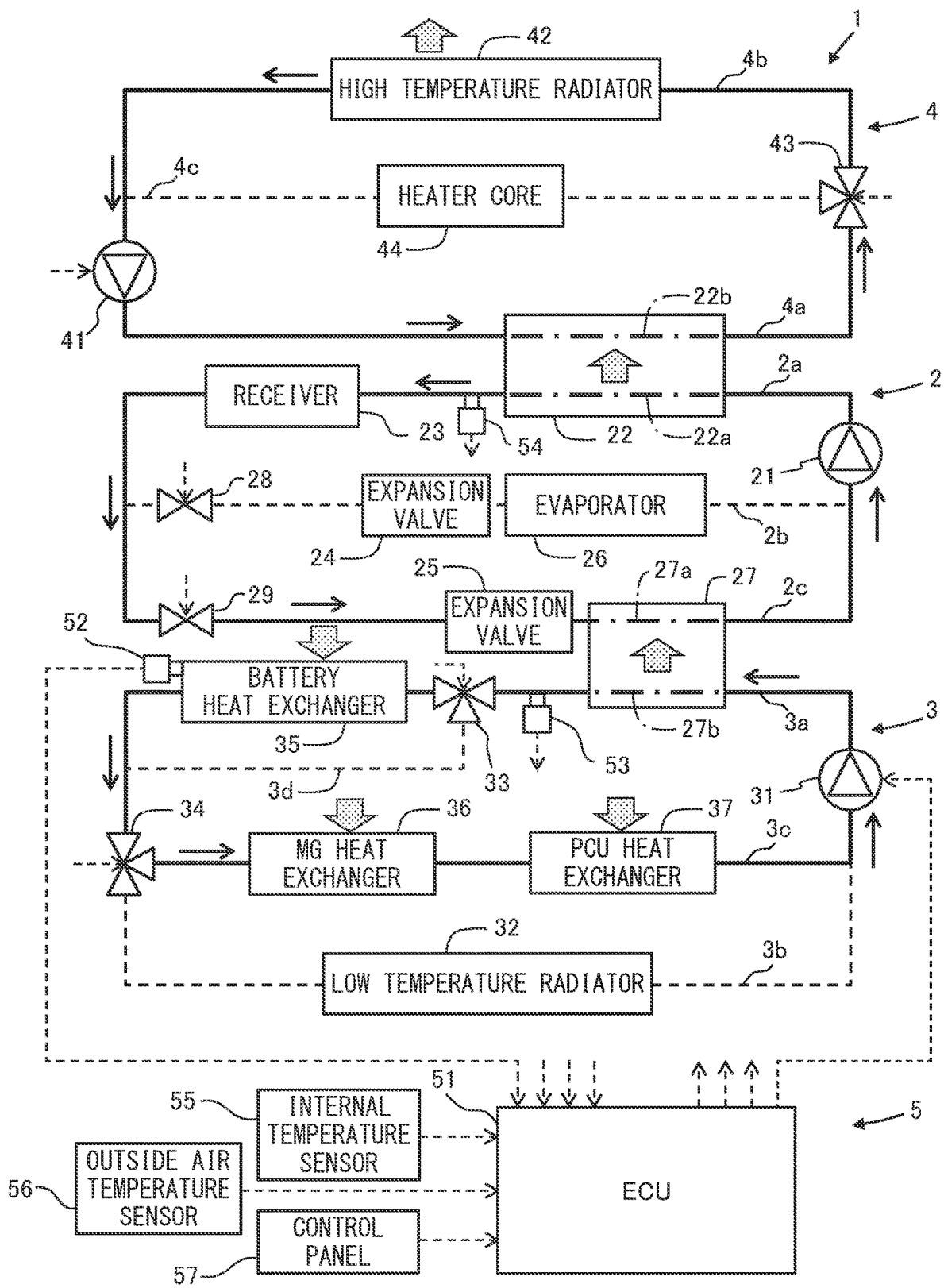
FIG. 5 shows an example of an operating state of a vehicle-mounted temperature controller in the case where rapid cooling of heat generating equipment, such as a battery, MG, PCU, is demanded (rapid cooling mode).
Figure 6:
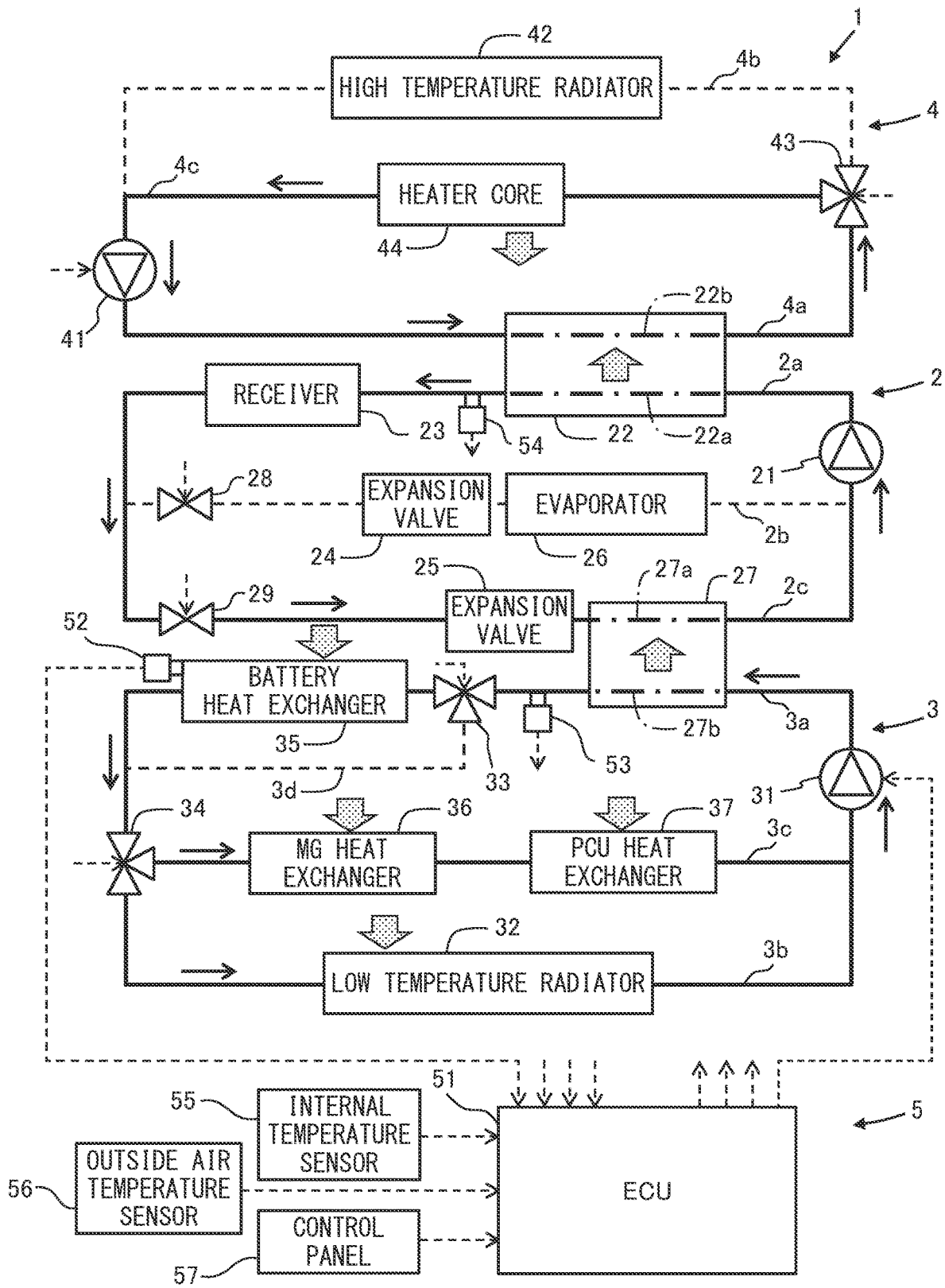
FIG. 6 shows an example of an operating state of a vehicle-mounted temperature controller in the case where heating of a passenger compartment is demanded (heating mode).

The control device 5 sets the operating mode of the vehicle-mounted temperature controller 1, based on the output signals of the battery temperature sensor 52, control panel 57, internal temperature sensor 55, and external temperature sensor 56. Below, referring to FIGS. 4 to 6, typical operating modes of the vehicle-mounted temperature controller 1 will be explained. In FIGS. 4 to 6, the flow paths through which the refrigerant or the cooling water flows are shown by the solid lines, while the flow paths through which the refrigerant or the cooling water does not flow are shown by the broken lines. Further, the fine arrows in the figure show the flow directions of the refrigerant or the cooling water, while the thick arrows show the transfer directions of heat.

FIG. 4 shows an example of the operating state of the vehicle-mounted temperature controller 1 in the case where cooling of the passenger compartment is demanded (cooling mode). In the cooling mode, the air to be cooled around the evaporator is cooled by the evaporator.

As shown in FIG. 4, in the cooling mode, all of the compressor 21, second pump 31, and first pump 41 are operated. Further, in the cooling mode, the first electromagnetic adjusting valve 28 is opened, the second electromagnetic adjusting valve 29 is closed, and the third three-way valve 43 is set to a high temperature radiator flow path 4b side. Further, in the example shown in FIG. 4, the first three-way valve 33 is set to the battery heat exchanger 35 side, and the second three-way valve 34 is set so that the cooling water flows to both of the low temperature radiator flow path 3b and the heat generating equipment flow path 3c.

As a result, in the cooling mode, at the evaporator 26, the heat of the surrounding air is transferred to the refrigerant and the surrounding air is cooled. As a result, the inside of the passenger compartment is cooled. On the other hand, at the condenser 22, the heat of the refrigerant is transferred to the cooling water of the high temperature circuit 4, and the cooling water of the high temperature circuit 4 is warmed. After that, this high temperature cooling water is cooled by heat exchange with the outside air at the high temperature radiator 42 and again flows into the condenser 22. Therefore, in the cooling mode, heat is absorbed from the surrounding air by the evaporator 26 and that heat is discharged at the high temperature radiator 42.

Further, in the cooling mode, at the battery heat exchanger 35, MG heat exchanger 36, or PCU heat exchanger 37, the heat of the battery, MG, or PCU is transferred to the cooling water. After that, the cooling water is cooled by heat exchange with the outside air at the low temperature radiator 32 and again flows into these heat exchangers. Therefore, in the cooling mode, heat is absorbed from the heat generating equipment at the heat exchanger for heat generating equipment, and that heat is discharged at the low temperature radiator 32.

Note that, when the temperature of the battery detected by the battery temperature sensor 52 is low, the first three-way valve 33 may be set to the bypass flow path 3d side. Further, when the temperature of the cooling water in the low temperature circuit 3 detected by the water temperature sensor 53 is low, the second three-way valve 34 may be set to the heat generating equipment flow path 3c side.

FIG. 5 shows an example of an operating state of the vehicle-mounted temperature controller 1 in the case where rapid cooling of the heat generating equipment, such as a battery, MG, or PCU, is demanded (rapid cooling mode). In the rapid cooling mode, the cooling water of the low temperature circuit 3 is cooled by the chiller, and in turn the battery or other heat generating equipment is cooled.

As shown in FIG. 5, in the rapid cooling mode, all of the compressor 21, second pump 31, and first pump 41 are operated. Further, in the rapid cooling mode, the first electromagnetic adjusting valve 28 is closed, the second electromagnetic adjusting valve 29 is opened, and the third three-way valve 43 is set to the high temperature radiator flow path 4b side. Further, the second three-way valve 34 is set to the heat generating equipment flow path 3c side and, in the example shown in FIG. 5, the first three-way valve 33 is set to the battery heat exchanger 35 side.

As a result, in the rapid cooling mode, the heat of the cooling water of the low temperature circuit 3 is transferred to the refrigerant at the chiller 27, whereby the cooling water is cooled. For this reason, in the low temperature circuit 3, the low temperature cooling water is circulated. As a result, in the battery heat exchanger 35, MG heat exchanger 36, and PCU heat exchanger 37, large amounts of heat are transferred to the cooling water from the battery, MG, and PCU, and accordingly the battery, MG, and PCU can be rapidly cooled.

On the other hand, in the rapid cooling mode, the heat of the refrigerant is transferred to the cooling water of the high temperature circuit 4 at the condenser 22 of the refrigeration circuit 2, whereby the cooling water of the high temperature circuit 4 is warmed. After that, this high temperature cooling water is cooled by heat exchange with the outside air at the high temperature radiator 42, and again flows into the condenser 22. Therefore, in the rapid cooling mode, in the heat exchanger for heat generating equipment, heat is absorbed from the heat generating equipment, and that heat is discharged at the high temperature radiator 42.

Note that, at the rapid cooling mode as well, if the temperature of the battery detected by the battery temperature sensor 52 is low, the first three-way valve 33 may be set to the bypass flow path 3d side. Further, the passenger compartment may be cooled in the rapid cooling mode as well. In this case, in the refrigeration circuit 2, the first electromagnetic adjusting valve 28 and the second electromagnetic adjusting valve 29 are both opened.

FIG. 6 shows an example of the operating state of the vehicle-mounted temperature controller 1 in the case where heating of the passenger compartment is demanded (heating mode). In the heating mode, the air to be heated around the heater core 44 is heated by the heater core 44.

As shown in FIG. 6, in the heating mode, all of the compressor 21, second pump 31, and first pump 41 are operated. Further, in the heating mode, the first electromagnetic adjusting valve 28 is closed, the second electromagnetic adjusting valve 29 is opened, and the third three-way valve 43 is set to the heater flow path 4c side. Further, in the example shown in FIG. 6, the first three-way valve 33 is set to the battery heat exchanger 35 side and the second three-way valve 34 is set so that cooling water flows to both of the low temperature radiator flow path 3b and the heat generating equipment flow path 3c.

As a result, in the rapid cooling mode, the heat of the cooling water of the low temperature circuit 3 is transferred to the refrigerant at the chiller 27, whereby the cooling water is cooled. The low temperature cooling water flows through the low temperature radiator 32, whereby heat is absorbed from the outside air. Further, the low temperature cooling water flows through the battery heat exchanger 35, MG heat exchanger 36, and PCU heat exchanger 37, whereby heat is absorbed from the battery, MG, and PCU. Cooling water absorbing heat from the outside air or heat generating equipment discharges the heat to the refrigerant at the chiller 27.

Further, in the rapid cooling mode, the heat of the refrigerant is transferred to the cooling water of the high temperature circuit 4 at the condenser 22 of the refrigeration circuit 2, whereby the cooling water of the high temperature circuit 4 is warmed. After that, this high temperature cooling water exchanges heat with the outside air at the heater core 44, whereby the air around the heater core 44 is warmed. Therefore, in the heating mode, heat is absorbed from the outside air at the low temperature radiator 32 and heat is absorbed from the heat generating equipment at the heat exchanger for heat generating equipment, and that heat is discharged at the heater core 44.

Control of Time of Start of Cooling

Figure 7:
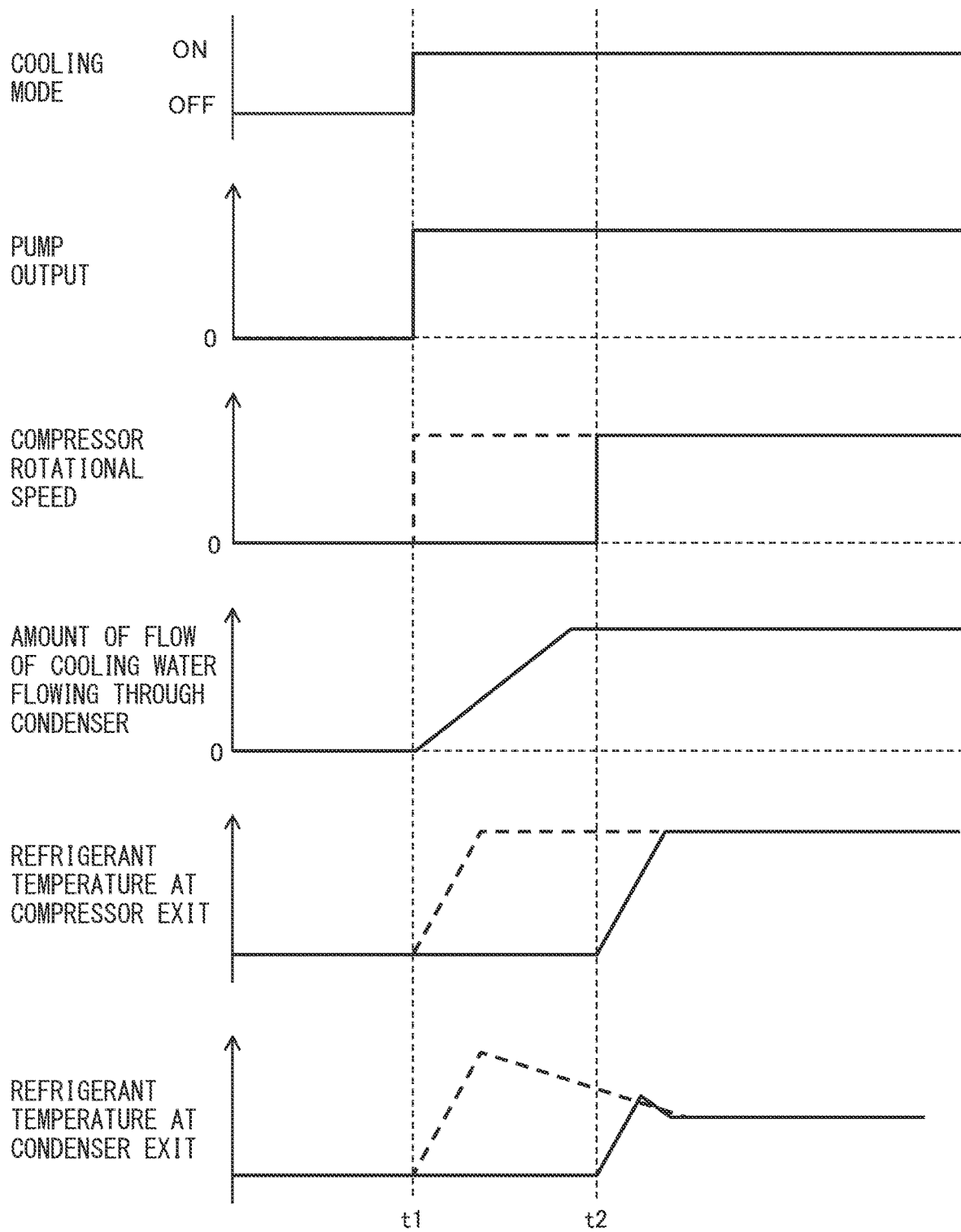
FIG. 7 is a time chart of the ON/OFF state of a cooling mode, etc., when starting cooling.

Next, referring to FIG. 7, control of the various types of actuators when starting cooling will be explained. FIG. 7 is a time chart of parameters, such as the ON/OFF state of the cooling mode, the output of the first pump 41, the rotational speed of the compressor 21, the amount of flow of the cooling water flowing through the condenser 22, the temperature of the refrigerant at the exit of the compressor 21, and the temperature of the refrigerant at the exit of the condenser, at the time of start of cooling. The solid lines in the figure show the changes in the case of driving the compressor and first pump 41 by the procedure in the present embodiment, while the broken lines in the figure show the changes in the case of driving the compressor and first pump 41 by a procedure different from the present embodiment.

In the example shown in FIG. 7, before the time t1, the cooling mode, rapid cooling mode, and heating mode are all set to OFF. Therefore, the second pump 31 is driven for cooling the MG or PCU, but the compressor 21 and first pump 41 are stopped.

In the example shown in FIG. 7, at the time t1, the cooling mode is switched from OFF to ON. In the present embodiment, at the time t1, along with switching the cooling mode to ON, the first pump 41 is started up. For this reason, after the time t1, the amount of flow of the cooling water flowing through the cooling water piping 22b of the condenser 22 gradually increases. On the other hand, in the present embodiment, at the time t1 when the cooling mode is switched from OFF to ON, the compressor 21 is not started up.

In the example shown in FIG. 7, after that, at the time t2 after the amount of flow of the cooling water flowing through the cooling water piping 22b of the condenser 22 becomes substantially constant, the compressor 21 is started up. If the compressor 21 is started up, the refrigerant is adiabatically compressed at the compressor 21, therefore the temperature of the refrigerant sent out from the compressor 21 rapidly rises. Along with this, the temperature of the refrigerant at the exit of the refrigerant piping 22a of the condenser 22 also rises.

In this regard, consider the case where, unlike the present embodiment, the compressor 21 is made to start up simultaneously with the first pump 41 at the time t1. In this case, as shown in FIG. 7 by the broken lines, after the time t1, the temperature of the refrigerant sent out from the compressor 21 rapidly rises. In this regard, however, at this time, a sufficient amount of cooling water still does not flow through the condenser 22. For this reason, the high temperature refrigerant pressurized by the compressor 21 cannot sufficiently discharge heat to the cooling water of the high temperature circuit 4 at the condenser 22. As a result, as shown in FIG. 7 by the broken lines, after the time t1, at the exit of the refrigerant piping 22a of the condenser 22, the temperature of the refrigerant rises.

If heat cannot be sufficiently discharged at the condenser 22 in this way, the evaporator is supplied with refrigerant which has not been sufficiently reduced in temperature, and the surrounding air is not sufficiently cooled at the evaporator 26. Therefore, the effect of cooling relative to the work, which the compressor 21 performs on the refrigerant, is small, and the effect of cooling at the time of start of cooling is low.

As opposed to this, in the present embodiment, by delaying the startup of the compressor 21, the refrigerant sufficiently discharges heat to the cooling water of the high temperature circuit 4 from right after the start of startup of compressor 21. For this reason, the evaporator 26 is supplied with refrigerant sufficiently reduced in temperature, therefore in the evaporator 26, the surrounding air is sufficiently cooled. Therefore, the effect of cooling relative to the work, which the compressor 21 performed on the refrigerant, is large, and the efficiency of cooling can be made high even at the time of start of cooling.

Note that, in the example shown in FIG. 7, control in the case of the cooling mode being switched from OFF to ON is shown, but similar control may also be performed even when the rapid cooling mode is switched from OFF to ON.

Control of Time of Start of Heating

Figure 8:
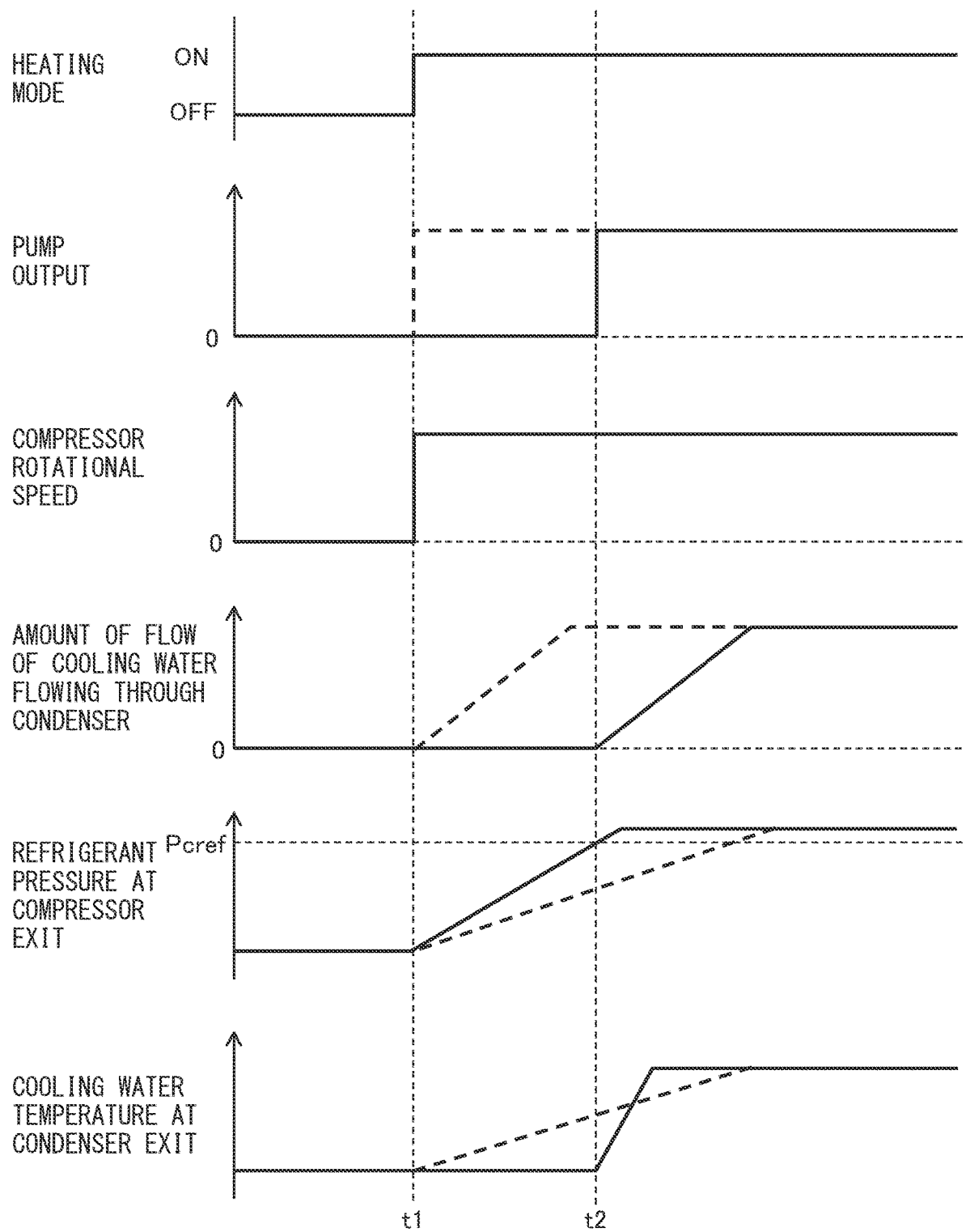
FIG. 8 is a time chart similar to FIG. 7 of the ON/OFF state of a heating mode, etc., when starting heating.

Next, referring to FIG. 8, control of the various types of actuators when starting heating will be explained. FIG. 8 is a time chart, similar to FIG. 7, of the parameters such as the ON/OFF state of the heating mode, at the time of start of heating.

In the example shown in FIG. 8, before the time t1, the cooling mode, rapid cooling mode, and heating mode are all set to OFF. Therefore, at the time t1, the heating mode is switched from OFF to ON. In the present embodiment, at the time t1, along with switching the heating mode to ON, the compressor 21 is started up. For this reason, after the time t1, the temperature and pressure of the refrigerant sent out from the compressor 21 gradually increase. On the other hand, in the present embodiment, at the time t1 when the heating mode is switched from OFF to ON, the first pump 41 is not started up.

When heating is being performed, basically, the temperature of the outside air is low, and accordingly the temperature and pressure of the refrigerant are both low. For this reason, the speed of rise of the temperature and pressure of the refrigerant from the startup of the compressor 21 is slower, compared with when the temperature of the outside air is high.

After that, if, at the time t2, the pressure of the refrigerant at the exit of the compressor 21 becomes equal to or greater than a predetermined reference pressure Pcref, the first pump 41 is started up. The predetermined reference pressure Pcref is suitably set so that compared with when starting up the first pump 41 simultaneously with the compressor 21 at the time t1 explained later, the temperature of the cooling water can be quickly risen and heating can be performed effectively earlier. Therefore, after the time t2, the amount of flow of cooling water flowing through the cooling water piping 22b of the condenser 22 gradually increases. Note that, even in the period from the time t1 to the time t2, heat is transmitted through the condenser to the cooling water, but the cooling water is not circulating, therefore in the example shown in FIG. 8, the temperature of the cooling water at the exit of the condenser in the period from the time t1 to the time t2 does not significantly rise.

In particular, in the example shown in FIG. 8, since the speed of rise of the temperature and pressure of the refrigerant from when starting up the compressor 21 is slow, the rise in pressure of the refrigerant at the exit of the compressor 21 is continued after the time t2. After that, after the temperature rises to a certain extent, the temperature and pressure of the refrigerant at the exit of the compressor 21 will be maintained substantially constant.

In this regard, unlike the present embodiment, consider the case of starting up the first pump 41 simultaneously with the compressor 21 at the time t1. In this case, as shown in FIG. 8 by the broken lines, after the time t1, the cooling water flowing through the cooling water piping 22b of the condenser 22 increases. However, at that time, the temperature of the refrigerant flowing from the compressor 21 to the refrigerant piping 22a of the condenser 22 is low. For this reason, even if the cooling water of the high temperature circuit 4 flows through the condenser 22, the temperature of the cooling water will not rise that much. As a result, the speed of rise of the temperature of the cooling water of the high temperature circuit 4 at the exit of the condenser 22 after the time t1 will be slow.

As opposed to this, in the present embodiment, by delaying the startup of the first pump 41, at the startup of the first pump 41 (time t2), the pressure and temperature of the refrigerant at the exit of the compressor 21 is high. For this reason, if the first pump 41 is started up at the time t2, after that, the cooling water of the high temperature circuit 4 at the exit of the condenser 22 is rapidly raised in temperature. As a result, it is possible to make the temperature of the cooling water rapidly rise, and accordingly possible to perform the heating effectively earlier.

Flow Chart

Figure 9:
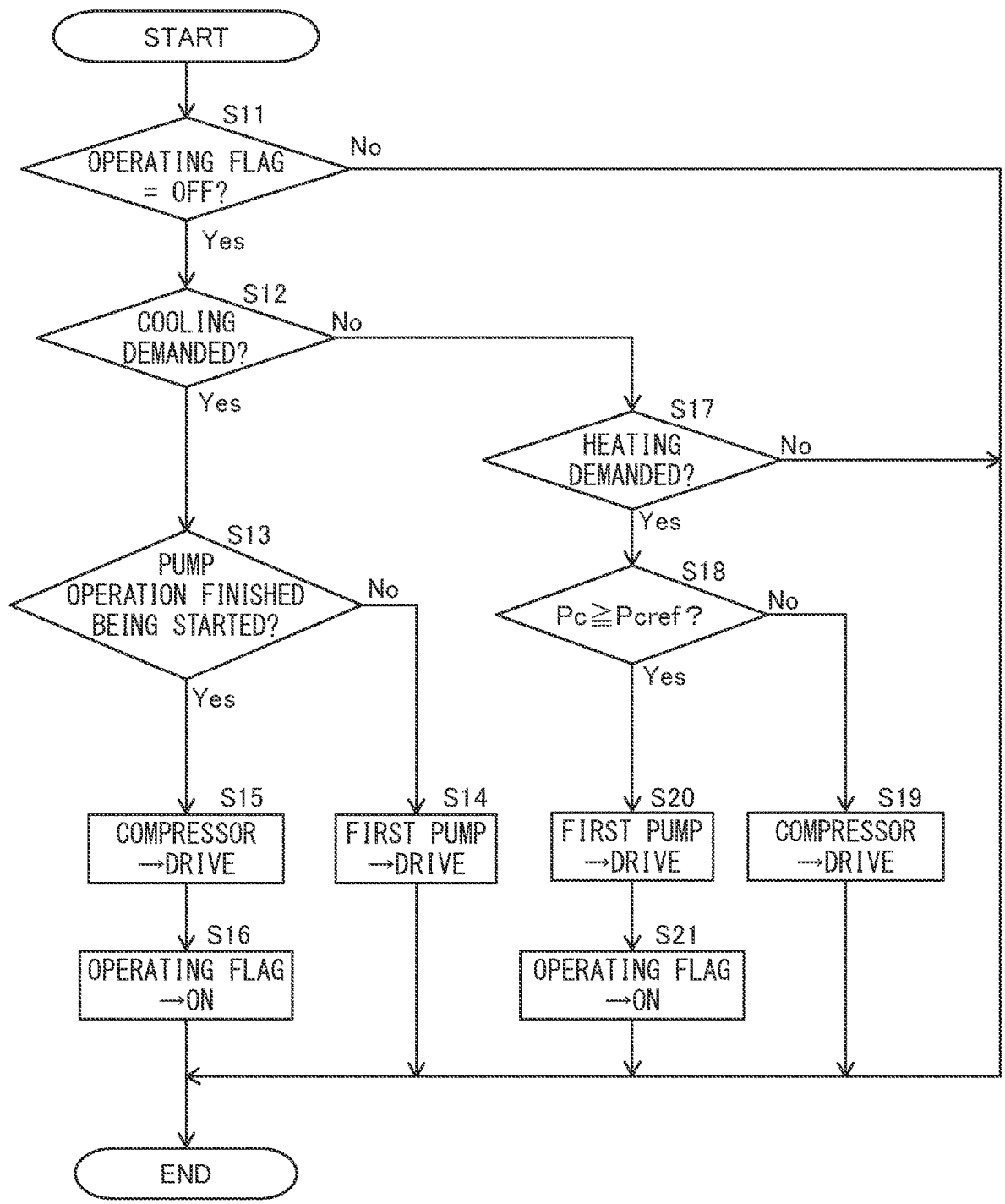
FIG. 9 is a flow chart of a control routine for controlling an actuator of a vehicle-mounted temperature controller when starting cooling or heating.

FIG. 9 is a flow chart of a control routine for controlling an actuator of a vehicle-mounted temperature controller 1 when starting cooling or heating. The shown control routine is performed by the ECU 51 every certain time interval.

First, at step S11, it is determined if the operating flag is OFF. The operating flag is a flag which is set to ON when the vehicle-mounted temperature controller 1 is in the cooling mode or the heating mode and cooling or heating is being performed, and which is otherwise set to OFF. If, at step S11, it is determined that the operating flag is not set to OFF, the control routine is ended. On the other hand, if, at step S11, it is determined that the operating flag is set to OFF, the control routine proceeds to step S12.

At step S12, it is determined if cooling has been demanded. For example, it is determined that cooling has been demanded when the user has depressed a cooling switch at the control panel 57 or if an auto switch has been depressed at the control panel 57 and the internal temperature detected by the internal temperature sensor 55 is equal to or greater than a reference high temperature (for example, 28° C.). If, at step S12, it is determined that cooling has been demanded, the control routine proceeds to step S13.

At step S13, it is determined if the first pump 41 has already started operating.

Alternatively, at step S13, it is also possible to determine if a predetermined time (for example, the time until the cooling water flowing through the cooling water piping 22b of the condenser 22 reaches near the target amount of flow) has elapsed from when the first pump 41 started operating. If, at step S13, it is determined that the first pump 41 is not yet operating, the control routine proceeds to step S14. At step S14, the first pump 41 is driven and the control routine is ended.

If the operation of the first pump 41 is started or if a predetermined time has elapsed from when operation of the first pump 41 is started, the routine proceeds from step S13 to S15 at the next control routine. At step S15, the compressor 21 is driven, then at step S16, the operating flag is set to ON and the control routine is ended.

On the other hand, if, at step S12, it is determined that cooling is not being demanded, the control routine proceeds to step S17. At step S17, it is determined if heating is being demanded. For example, it is determined that heating has been demanded when the user has depressed a heating switch at the control panel 57 or when an auto switch has been depressed at the control panel 57 and the internal temperature detected by the internal temperature sensor 55 is equal to or less than a reference low temperature (for example, 15° C.). If, at step S17, it is determined that heating has not been demanded, the control routine is ended. On the other hand, if, at step S17, it is determined that heating has been demanded, the control routine proceeds to step S18.

At step S18, it is determined if the pressure Pc of the refrigerant detected by the refrigerant pressure sensor 54 is equal to or greater than the reference pressure Pcref. If it is determined that the pressure Pc of the refrigerant is lower than the reference pressure Pcref, the control routine proceeds to step S19. At step S19, the compressor 21 is driven and the control routine is end.

After that, if the pressure Pc of the refrigerant rises to equal to or greater than the reference pressure Pcref due to driving the compressor 21, at the next control routine, the routine proceeds from step S18 to S20. At step S20, the first pump 41 is driven, then at step S21, the operating flag is set to ON, and the control routine is ended.

Note that, the operating flag is reset to OFF if the compressor 21 and first pump 41 are stopped along with the cooling or heating being stopped.

Above, preferred embodiments according to the present disclosure were explained, but the present disclosure is not limited to these embodiments and can be corrected and changed in various ways within the language of the claims.

REFERENCE SIGNS LIST 1 vehicle-mounted temperature controller
2 refrigeration circuit
3 low temperature circuit
4 high temperature circuit
21 compressor
22 condenser
26 evaporator
27 chiller
31 second pump
32 low temperature radiator
41 first pump
42 high temperature radiator
44 heater core

The invention claimed is:

1. A vehicle-mounted temperature controller comprising:
a first heat circuit having a first radiator exchanging heat with outside air, a first heat exchanger, a heater core used for heating an inside of a passenger compartment of a vehicle in which the temperature controller is mounted, and a first pump, the first heat circuit being configured so that when the first pump is driven, a first heat medium is circulated through the first heat circuit, the first heat circuit also being configured to be able to change a circulation mode of the first heat medium so that the first heat medium circulates through at least one of the first radiator and the heater core;
a refrigeration circuit having the first heat exchanger discharging heat from a refrigerant to the first heat medium to make the refrigerant condense, a second heat exchanger transferring heat to the refrigerant to make the refrigerant evaporate and to cool an object to be cooled, and a compressor, the refrigeration circuit being configured so that when the compressor is driven, the refrigerant circulates through the first heat exchanger and the second heat exchanger to realize a refrigeration cycle; and
an electronic control unit configured to: (i) when starting to cool the object to be cooled, start up the compressor after starting up the first pump, and (ii) when starting to heat the passenger compartment, start up the first pump after starting up the compressor, and control the first heat circuit so that the first heat medium circulates so as to flow through the heater core.

2. The vehicle-mounted temperature controller according to claim 1, wherein the electronic control unit is configured to, when cooling the object to be cooled, control the first heat circuit so that the first heat medium is circulated so as to flow through the first radiator.

3. The vehicle-mounted temperature controller according to claim 1, further comprising
a second heat circuit having a second radiator exchanging heat with the outside air, the second heat exchanger, an equipment heat exchanger for heat generating equipment, which exchanges heat with the heat generating equipment, and a second pump, wherein
the second heat circuit is configured to be able to change a circulation mode of a second heat medium so that the second heat medium flows through the second heat exchanger and circulates through at least one of the second radiator and the equipment heat exchanger, and
the electronic control unit is configured to, when heating the passenger compartment, control the second heat circuit so that the second heat medium is circulated so as to flow through the second radiator.

4. The vehicle-mounted temperature controller according to claim 3, wherein the electronic control unit is configured to, when cooling the second heat medium as the object to be cooled so as to cool the heat generating equipment, control the second heat circuit so that the second heat medium is circulated so as to flow through the equipment heat exchanger.

* * * * *